No. 755,131. PATENTED MAR. 22, 1904.
H. S. HELE-SHAW & R. B. HELLIWELL.
WHEEL FOR VEHICLES.
APPLICATION FILED APR. 10, 1903.
NO MODEL. 5 SHEETS—SHEET 1.
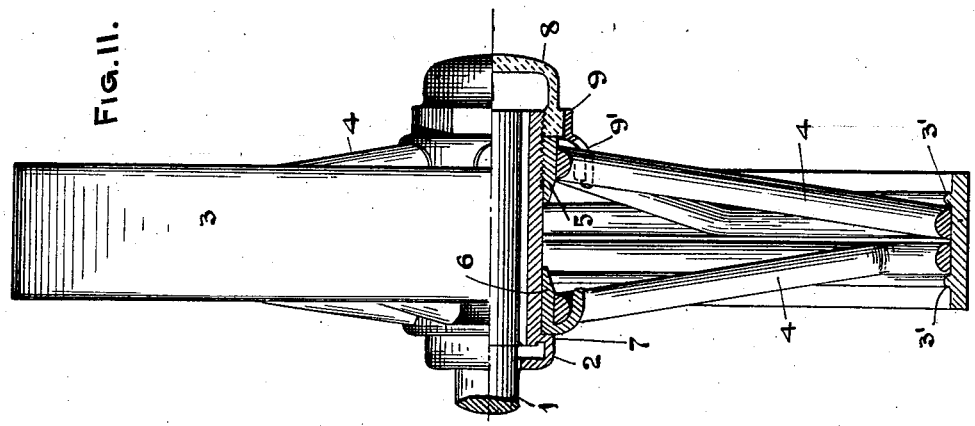
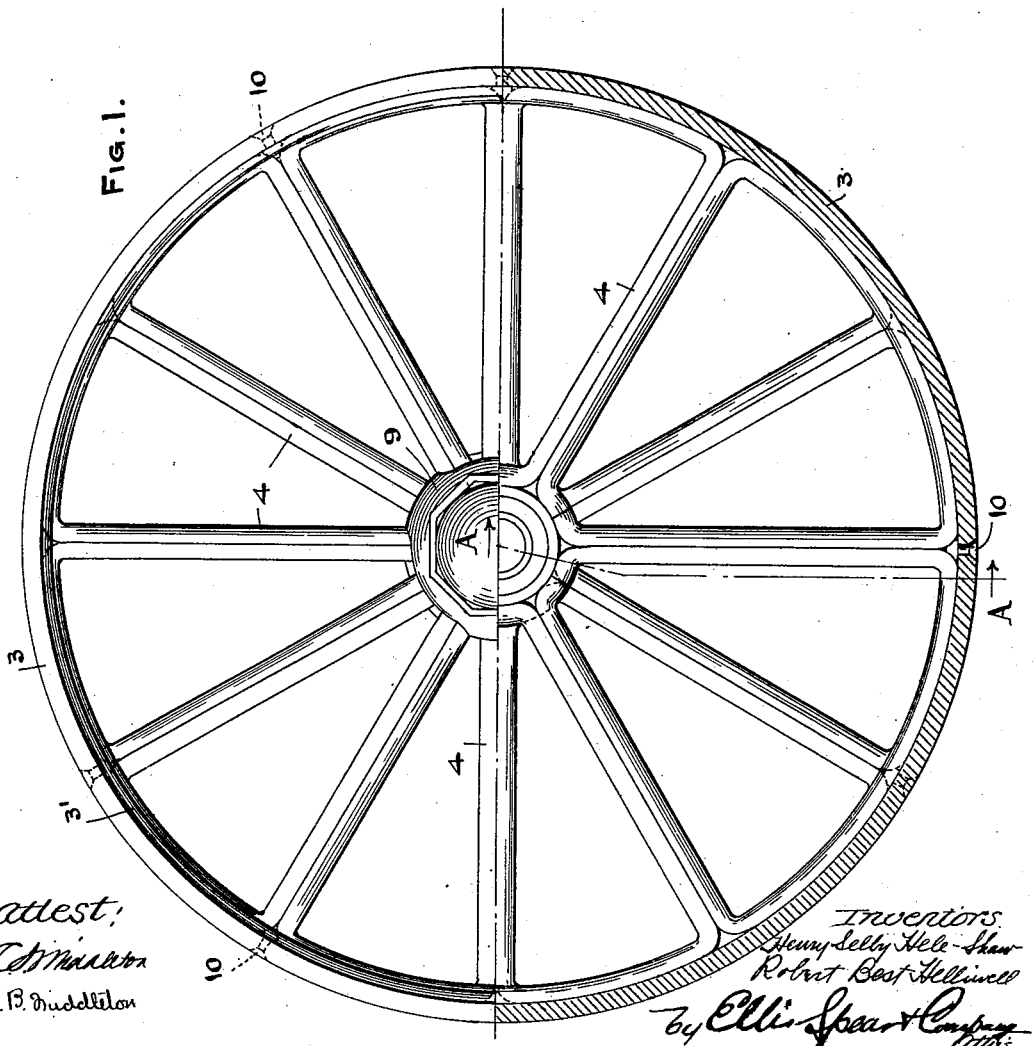

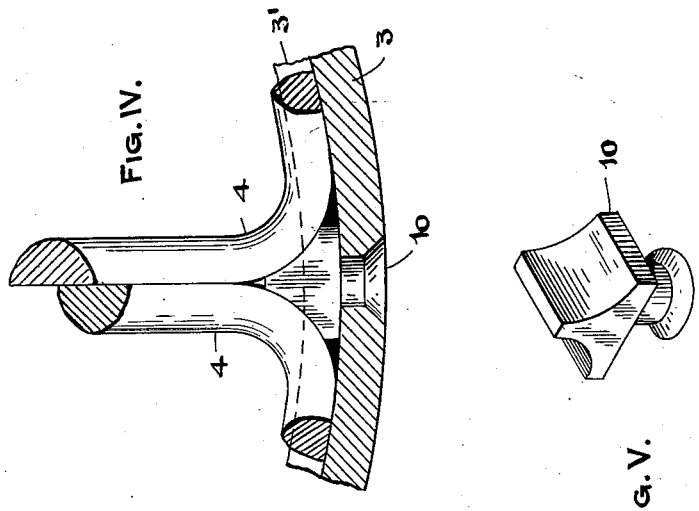
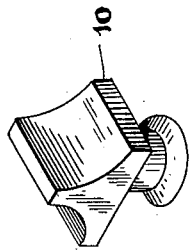
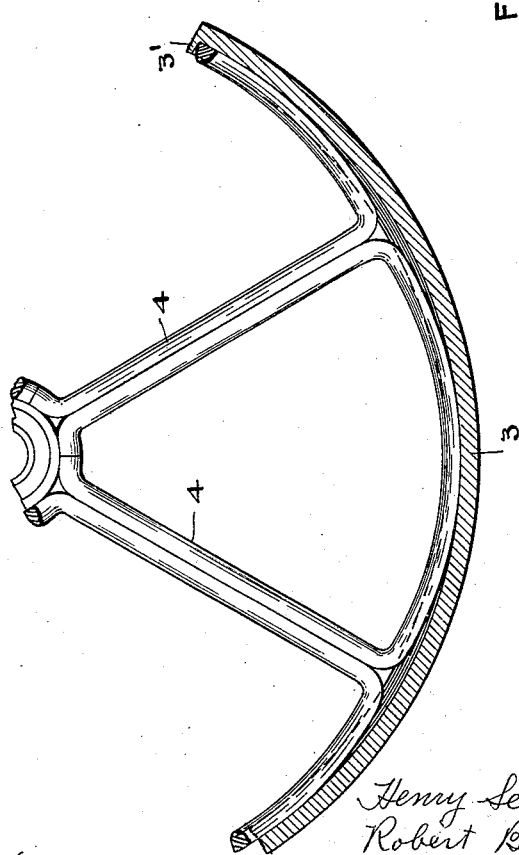

No. 755,131. PATENTED MAR. 22, 1904.
H. S. HELE-SHAW & R. B. HELLIWELL.
WHEEL FOR VEHICLES.
APPLICATION FILED APR. 10, 1903.
NO MODEL. 5 SHEETS—SHEET 3.
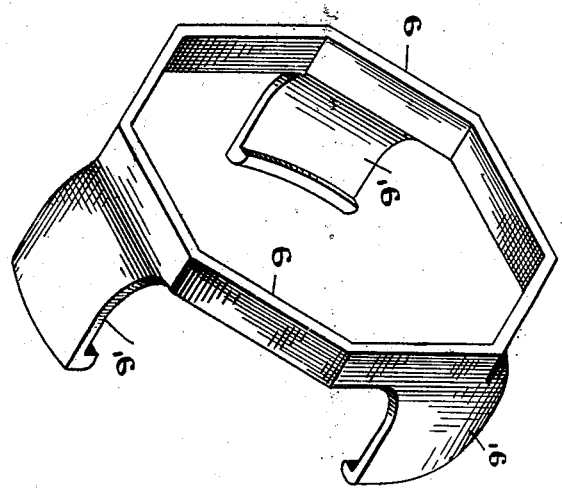
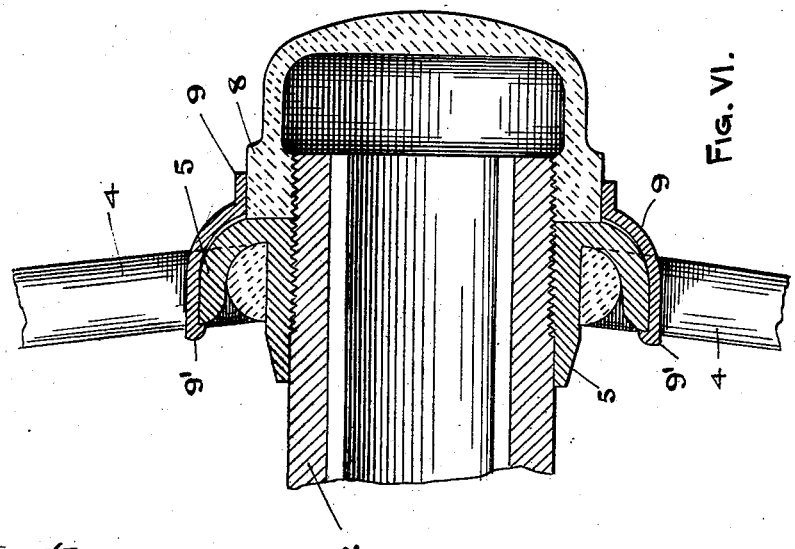

No. 755,131. PATENTED MAR. 22, 1904.
H. S. HELE-SHAW & R. B. HELLIWELL.
WHEEL FOR VEHICLES.
APPLICATION FILED APR. 10, 1903.
NO MODEL. 5 SHEETS—SHEET 4.
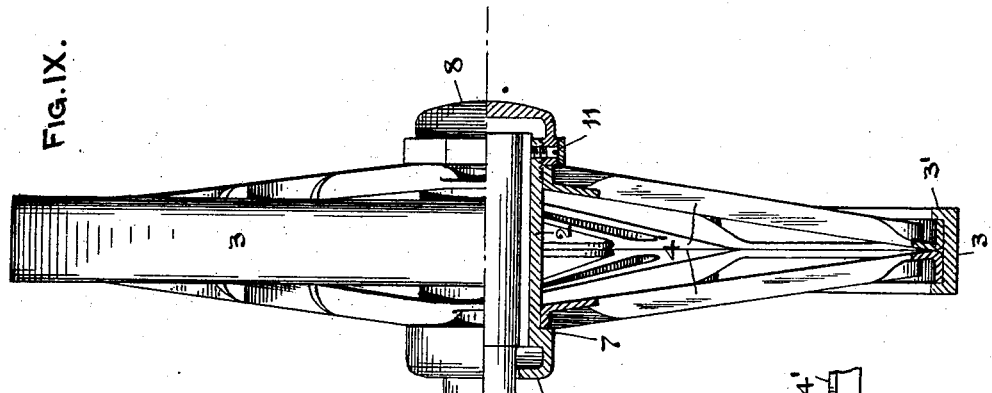
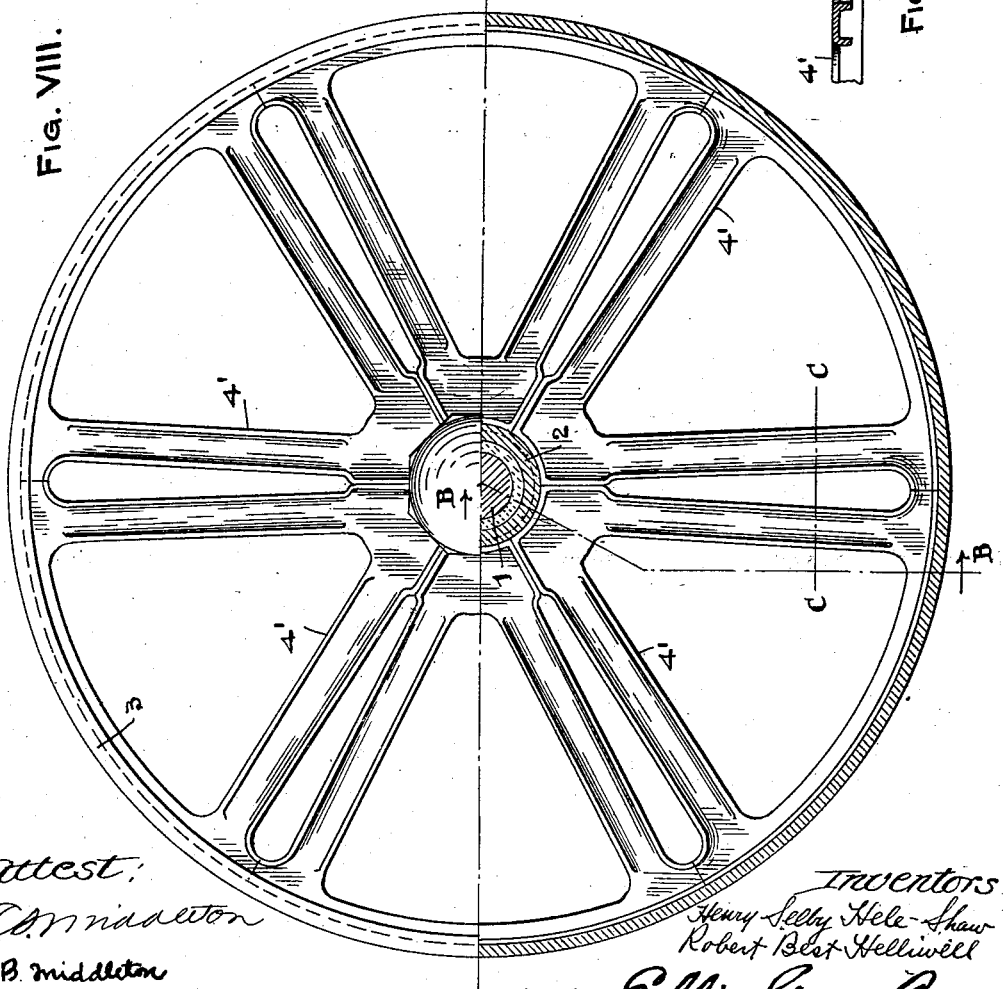

No. 755,131.  
PATENTED MAR. 22, 1904.  
H. S. HELE-SHAW & R. B. HELLIWELL  
WHEEL FOR VEHICLES.  
APPLICATION FILED APR. 10, 1903.  
NO MODEL.  
5 SHEETS—SHEET 5.
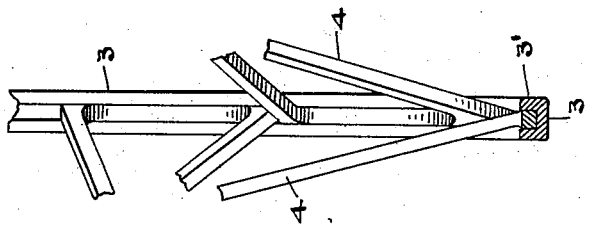
FIG. XII.
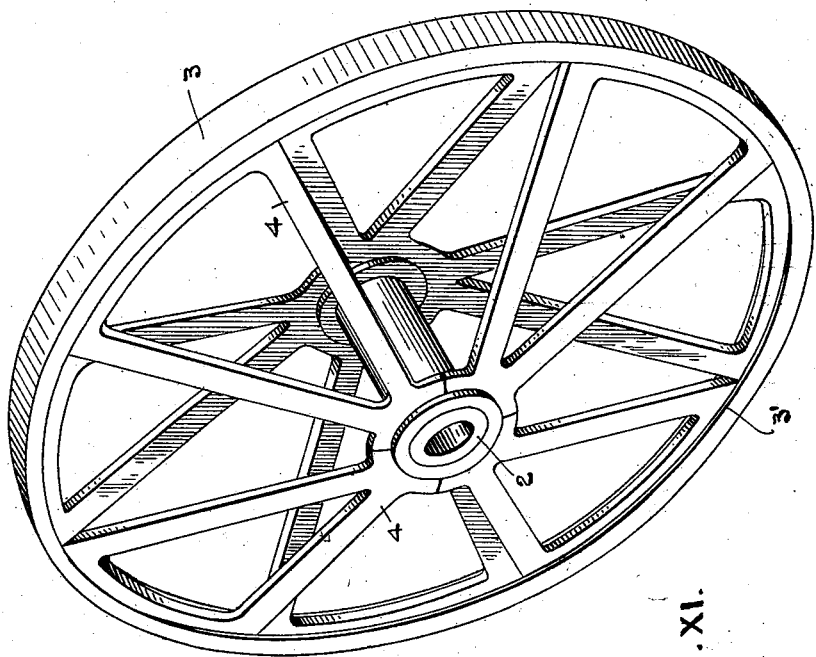
FIG. XI.
Attest:  
C. Middleton  
S. B. Middleton
Inventors  
Henry Selby Hele-Shaw  
Robert Best Helliwell  
by Ellis Spear Company  
attys No. 755,131.

Patented March 22, 1904.

UNITED STATES PATENT OFFICE.

HENRY SELBY HELE-SHAW, OF LIVERPOOL, AND ROBERT BEST HELLI-WELL, OF WATERLOO, ENGLAND.

WHEEL FOR VEHICLES.

SPECIFICATION forming part of Letters Patent No. 755,131, dated March 22, 1904.

Application filed April 10, 1903. Serial No. 152,059. (No model.)

*To all whom it may concern:*

Be it known that we, HENRY SELBY HELE-SHAW, residing in Liverpool, and ROBERT BEST HELLIWELL, residing in Waterloo, near Liverpool, in the county of Lancaster, England, subjects of the King of Great Britain, have invented certain new and useful Improvements in Wheels for Vehicles or the Like, of which the following is a specification.

Our present invention has reference to wheels, and more particularly to vehicle-wheels subject to severe usage, as in the case of self-propelled vehicles, gun-carriages, or lorries; and the object of our invention is to provide a wheel which shall be cheap, light, and durable and which can be easily repaired by the renewal of the defective part.

It is found that the tires of wheels are liable to become expanded by the hammering action on a hard road-surface, with the result that they become loose; and a further object of our invention is to overcome this difficulty.

We have illustrated our invention in the accompanying drawings, in which—

Figure I is an elevation of a wheel constructed in accordance with our invention, the lower part of the rim being in medial section. Fig. II is a side elevation, the lower half of the view being in section on the line A A of Fig. I. Fig. III is a detail view showing the spring formation of a sector. Figs. IV and V illustrate a detail of the stop-pieces, Fig. IV being a fragmentary elevation in part section and Fig. V a perspective view of the stop. Figs. VI and VII illustrate in detail the locking arrangement. Figs. VIII and IX illustrate a wheel with a modified form of sectors. In the lower part of Fig. VIII the rim is in section, and the lower part of Fig. IX is in section on the line B B of Fig. VIII; and Fig. X is a fragmentary section on the line C C of Fig. VIII. Fig. XI is a perspective view showing a modified form of sector. Fig. XII is a fragmentary section of Fig. XI, showing the interior of the rim.

Broadly described, our invention consists in forming the part of the wheel between the hub and the rim of two sets of sectors splayed on opposite sides of the medial plane of the wheel, their peripheries being adjacent at and in contact with the rim and the central parts apart, but so secured to the hub as to be adapted to be drawn together, so that the axial contraction gives a radial expansion which is adjustable.

Referring first to Figs. I to VII, 1 is the axle; 2, the hub; 3, the rim or tire, and 4 the sectors. In this case the sectors embrace an angle of sixty degrees and are formed by bending steel of half-round cross-section. Six of these sectors are arranged on each side of the medial plane of the wheel. Their peripheries are contiguous at the rim and are housed by the internal flanges 3'. The central parts are housed in two flanges 5 and 6. The flange 6 bears against a collar 7 on the hub, and the flange 5 is screwed and fits a screwed part of the hub. If the sectors are put in place (and they may be arranged so that two sets are opposite each other, as in Fig. VIII, or alternately disposed, as in Fig. I) and the rim of the wheel with the sectors and the flanges 5 and 6 be rotated, the flange 5 will approach 6, and by contracting the axial distance between them expand the circumference of the sectors and make a firm but resilient adjustable connection between the rim or tire and the hub. The flange 5 is prevented from backing off by the lock-nut 8, and this in turn is prevented from rotating relatively to the sectors by the cap 9, which in the present instance is of octagonal configuration and fits over the octagonal lock-nut. The clips 9' spring over the flange 5 between the sectors. This is shown clearly in Figs. VI and VII. In order to increase the resilient effect, the curvature of the periphery of the sectors is made of a somewhat less radius than the interior of the rim or tire, as shown in Fig. III, with the result that the center part thereof comes into contact first and gives a spring-contact between the sectors and the rim. In order to prevent the creeping of the sectors round the rim, three or more stop-pieces 10 are fitted to the rim in between pairs of sectors, as shown in Figs. IV and V.

In the wheel illustrated in Figs. VIII and IX the sectors 4' are of such shape as would be adopted when they were to be may of, say, cast-steel, and it will be noted that in this illustration the sectors of the two series are opposite each other. The screwed flange 5 is in this case locked by the set-screw 10.

It will of course be understood that the bearing may be of any suitable type or that the hub may be rigidly connected to the axle, if need be, and that the rim may, as in the cases illustrated, form the tire, or it may be adapted to carry a tire—say a pneumatic tire—if so desired. Further, an elastic or yielding material may be interposed between the sectors and the rim to absorb shocks. The flanges 5 and 6 may in some cases be drawn together by bolts, which bolts may pass through the respective sectors.

Having now fully described our invention, what we claim, and desire to secure by Letters Patent, is—

1. In a wheel, in combination with the rim and the hub; two series of sectors, splayed outwardly on opposite sides of the medial plane of the wheel from rim to hub and connecting the rim to the hub, the sectors of each series abutting against each other throughout the entire extent of the wheel; and means for expanding the peripheries of the sectors by drawing the central portions thereof together; substantially as described.

2. In a wheel, in combination with the rim and the hub; two series of sectors, splayed outwardly on opposite sides of the medial plane of the wheel from rim to hub and connecting the rim to the hub, the portions of the sectors joining the centers to the peripheries being shaped to form, when assembled, the spokes of the wheel and the sectors of each series abutting against each other throughout the entire extent of the wheel; and means for expanding the peripheries of the sectors by drawing the central portions thereof together; substantially as described.

3. In a wheel, in combination with the rim and the hub; two series of sectors, splayed outwardly on opposite sides of the medial plane of the wheel from rim to hub and connecting the rim to the hub, the peripheries of the sectors being unconnected with the rim and having a radius of curvature less than that of the interior of the rim; and means for expanding the peripheries of the sectors by drawing the central portions thereof together; substantially as described.

4. In a wheel, in combination with the rim and the hub; two series of sectors, splayed outwardly on opposite sides of the medial plane of the wheel from rim to hub and connecting the rim to the hub, the sectors being built up of section metal bent to shape and the sectors of each series abutting against each other throughout the entire extent of the wheel; and means for expanding the peripheries of the sectors by drawing the central portions thereof together; substantially as described.

5. In a wheel, in combination with the rim and the hub; two series of sectors, splayed outwardly on opposite sides of the medial plane of the wheel from rim to hub and connecting the rim to the hub, the sectors being built up of section metal bent to shape, the radial parts of adjacent sectors abutting to form spokes, said sectors having their ends bent inwardly to abut each other, and resting on the hub; and means for expanding the peripheries of the sectors by drawing the central portions thereof together; substantially as described.

6. In a wheel, in combination with the rim and the hub; two series of sectors, splayed outwardly on opposite sides of the medial plane of the wheel from rim to hub, and connecting the rim to the hub, the sectors being built up of solid half-round section metal bent to shape, the radial parts of adjacent sectors abutting together to form circular spokes, said adjacent parts being unconnected; and means for expanding the peripheries of the sectors by drawing the central portions thereof together; substantially as described.

7. In a wheel, in combination with the rim and the hub; two series of sectors, splayed outwardly on opposite sides of the medial plane of the wheel from rim to hub and connecting the rim to the hub, the sectors of the two series being relatively disposed so that the joints of the one series come opposite the centers of the other series; and means for expanding the peripheries of the sectors by drawing the central portions thereof together; substantially as described.

8. In combination with the hub, the sectors and the means for drawing the centers of the sectors together, the rim recessed to house the peripheries of the sectors and hold them contiguously; substantially as described.

9. In combination with the rim, the hub, the sectors and means for drawing the centers of the sectors together, the stops interposed between the sectors and attached to the rim; substantially as described.

10. In combination with the rim, the sectors, the hub and the flanges, the means for locking the axially-adjustable flange consisting of a prismatic lock-nut, and a prismatic cap fitting thereon and having spring-clips adapted to engage over the flanges and between the arms of the sectors; substantially as described.

11. In combination, the recessed rim, the sectors formed of section metal, the hub, the flanges on the hub recessed to house the bent inner ends of the sectors, and the means for locking the adjustable flange; substantially as described.

12. In combination, the rim recessed annularly to house the peripheries of the sectors contiguously, the sectors of section metal the peripheries of which are bent to a smaller radius of curvature than the said recess, the hub, the flange on the hub, capable of rotation thereon but incapable of axial movement from the center, the screwed flange axially movable on the screwed part of the hub and adapted when the rib, sectors and flanges are rotated relatively to hub, to move axially relatively to the other flange, and the locking means; substantially as described.

In testimony whereof we have hereunto set our hands in the presence of two subscribing witnesses.

HENRY SELBY HELE-SHAW.
   ROBERT BEST HELLIWELL.

Witnesses to the signature of Henry Selby Hele-Shaw:
 J. E. LLOYD BARNES,
 REGINALD SMITH.

Witnesses to the signature of Robert Best Helliwell:
 J. E. LLOYD BARNES,
 JOSEPH E. HIRST,